Patented Dec. 4, 1945

2,390,164

UNITED STATES PATENT OFFICE 2,390,164

CONJOINT POLYMERIZATION PRODUCTS

Eugene W. Moffett, Milwaukee, Wis., and Roy E. Smith, New York, N. Y., assignors to Pittsburgh Plate Glass Company, a corporation of Pennsylvania No Drawing. Original application April 5, 1940, Serial No. 327,996. Divided and this application May 5, 1943, Serial No. 485,746

3 Claims. (Cl. 260—86)

This invention relates to a series of resins obtained by the copolymerization of esters of vinyl alcohol with certain esters of allyl alcohol. The vinyl esters may be defined as those of saturated organic acids or inorganic acids such as vinyl acetate and vinyl chloride, respectively. The allyl esters may be similarly defined as those of saturated organic acids or inorganic acids such allyl acetate and allyl chloride, respectively.

Processes involving the copolymerization of two or more polymerizable organic compounds have long been known and widely used. Resins resulting from such processes frequently differ widely in properties from the resins obtained by the simple polymerization of either monomer alone or of mechanical mixtures of the two simple polymers.

Perhaps the most widely exploited of the copolymers are those of vinyl acetate and vinyl chloride known commercially as Vinylite resins. Both monomers had been previously polymerized alone to yield resins, each of which was useful for certain specific uses. The copolymers were entirely different from either of the simple resins and were capable of much wider and more diversified use.

It will be observed that these copolymers are derived from monomers, each of which is readily capable of polymerization alone to a good yield of a well characterized resin. The new copolymers described in this disclosure are derived from one readily polymerizable material and a second substance most difficultly polymerizable. The simple allyl esters polymerize with great difficulty and in very poor yields to resins of low molecular weight and no known utility.

It would normally be anticipated under such circumstances that the readily polymerizable compound would be converted into resin leaving the highly inactive allyl esters behind. Such was not found to be the case, however. The vinyl and allyl esters copolymerized readily under normal polymerizing conditions using peroxide catalysts to good yields of well characterized and useful resins. The process and products are more fully described herein below.

In the present invention, the allyl esters used correspond to one of the general formulae

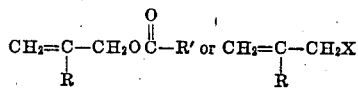

wherein R is hydrogen or a lower alkyl radical, R' is hydrogen or a saturated alkyl or aryl radical and X is chlorine. The vinyl ester used corresponds to one of the general formulae

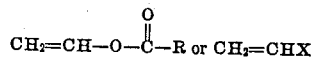

wherein R is hydrogen or a lower saturated alkyl radical and X is chlorine. The allyl ester is mixed with the vinyl ester in ratios from about 1 to 50 parts by weight of the former to 50 to 99 parts by weight of the latter. The polymerization reaction becomes slower with increasing concentrations of the allyl esters and it is impractical to use more than an equal weight of the latter The polymerizations are carried out in the presence or absence of a diluent and at temperatures suitably in a range between 15° and 115° C. The exact conditions for any given polymerization are selected on the basis of the character of the monomers chosen and the properties desired in the product. In general, it is advisable to use a diluent because the reaction is exothermic and may be more readily controlled in the presence of a diluent. The reactions are carried out in any suitable vessel taking into account, of course, the character of the monomer materials. Thus, polymerizations in which vinyl acetate is a reactant may be carried out under reflux in glass at ordinary pressures. When vinyl chloride is a reactant a pressure vessel is required. Lead or glass lined steel equipment has been found very satisfactory for the purpose.

The polymerizations may be catalyzed in the usual manner using light or an organic peroxide such as an benzoyl peroxide and the like.

The new resins vary widely in properties depending on the character of the monomers employed and the conditions of polymerization. They are thermoplastic and, in general, are well characterized solids at room temperatures. They are usually soluble in properly selected organic solvents from solutions in which they may be isolated by precipitation with a non-solvent or by steam distillation.

The resins are capable of a wide variety of applications. They are unusually stable to the effects of light and heat, a property which is particularly advantageous in application as a finishing material. Thus, solutions of the allyl acetate—vinyl chloride resin may be coated on iron or tin-plate and the resulting films baked ½ hour at 325–350° F. without visible decomposition. These solutions are likewise characterized by low viscosity, another advantage when used as a lacquer base.

These properties are also advantageous in other applications of the resin. Molded into transparent discs and the like, they are characterized by unusual stability to light. Moldings may be made from the resins with or without plasticizers, pigments, or dyestuffs, fillers and the like. The resins may also be extended as films, filaments and the like and adapted to the uses thereof. The softer of the resins may be used as adhesives particularly in applications where color retention and permanent thermoplasticity are required.

Vinyl compounds suitable for use in practicing the invention including the vinyl halides, such as vinyl chloride and bromide, the vinyl esters, such as vinyl acetate, vinyl propionate, vinyl butyrate, vinyl chloroacetate, vinyl tricholoracetate and any of the other readily polymerizable vinyl compounds. The allyl compounds to be conjointly polymerized with any of the vinyl compounds include the allyl and methallyl halides, such as allyl and methallyl chloride or bromide, allyl alcoho, allyl esters, such as allyl acetate, ally propionate, allyl butyrate, allyl caproate, allyl linoleate, allyl chloroacetate, allyl trichloroacetate. It will be apparent that mixtures of vinyl halides and vinyl esters may be conjointly polymerized with an allyl compound. For example, a mixture consisting of 10 to 90% of vinyl chloride and the remainder being a vinyl ester, such as vinyl acetate or vinyl butyrate may be conjointly polymerized with allyl chloride, allyl alcohol, allyl acetate, or allyl butyrate. The ratio of the allyl compound may be, for example, 10 to 50% of the mixture of vinyl compound and allyl compound. Mixtures of allyl compounds, such as allyl alcohol or allyl chloride with allyl acetate or butyrate are contemplated. These mixtures of allyl compounds may be incorporated with any one of the vinyl compounds or with the mixtures of vinyl compounds above mentioned.

Solutions of resins in clear state or admixed with pigments such as titanium dioxide in amounts of 5 or 10% or more may be used for coating wood and metal, or for coating fabrics of cotton, rayon, silk, nylon, linen and the like.

The resins herein disclosed in addition to being useful with solvents as coating compositions are also useful as bonding agents or cements for wood, leather and fiber. Solutions and liquid resins in an amount of 30% or more may be admixed with wood flour or other filler and dried to form powders which are useful for molding under heat and pressure. The solutions and liquid resins may also be spun to form fine fibers suitable for use in the fabrication of textiles. The use of sheets of the clear resins as interlayers in safety glass is contemplated. Similarly, the use of solutions of the resins or of the liquid resins as cements for application to other plastic material, such as cellulose acetate to provide a bond in safety glass is also contemplated. When the resins are employed as interlayers or as bonds for interlayers for safety glass, the sheet material is laminated between two or more sheets of glass by application of heat and pressure, in accordance with conventional methods.

Tin cans and other containers for beer and other food products can be coated with the solutions of the resins and baked to provide surface films, which will resist the action of the contents. Also, paper, Cellophane and other wrapping materials for cigarettes, cheese and other comestible products may be coated with the resins. The addition of moistureproofing agents, such as paraffin or other wax, either to the resin solutions, or as discrete films to the surface of the resin films, is contemplated.

The addition of plasticizers, such as diethyl phthalate to the resins is contemplated. Similarly the modification of the resins by the addition of other resins, such as vinyl resin, in amounts of 5% or more and drying oils, is within the purview of the invention.

The following examples serve to illustrate the practice of the invention but are not to be construed as limiting the scope thereof:

*Example 1*

A solution consisting of 50 parts by weight of allyl acetate, 86 parts of vinyl acetate, 55 parts of butyl acetate and 0.8 of a part of acetyl peroxide was heated for 13 hours under reflux. During this time, the reflux temperature gradually increased from 93° to 107° C. and the solution increased in viscosity. There was thus obtained a clear resin solution of relatively low viscosity from which was isolated, by steam distillation, a 74% yield of solid resin.

The product was reasonably soft at room temperature and was very soft at 60° C. It was soluble in all common organic solvents except the aliphatic hydrocarbons. Its properties were such as to recommend it for use as a permanently thermoplastic adhesive.

The same polymer was obtained in somewhat lower yields by carrying out the reaction at 50±3° C. for 72 hours in the absence of a solvent using benzoyl peroxide as a catalyst. Analysis indicated that the final resin was composed of 33% by weight of allyl acetate and 67% of vinyl acetate.

*Example 2*

A solution consisting of 78 parts by weight of allyl caproate and 86 parts of vinyl acetate in 41 parts of toluene, was heated 3 hours under reflux in the presence of 4.9 parts of benzoyl peroxide. The temperature rose as the polymerization proceeded from 79° to 100° C. and the viscosity of the solution increased.

The polymer was isolated in an 80% yield by steam distillation of the solvent and unreacted monomers. It was a light yellow, soft, highly adhesive resin soluble in all common organic solvents except petroleum hydrocarbons.

*Example 3*

A mixture of 10 parts by weight of methallyl chloride and 10 parts of vinyl acetate was heated under reflux for 11 hours in the presence of 0.4 of a part of benzoyl peroxide. The temperature rose during this time from 73° to 90° C. and there was obtained a sticky fluid polymer by steam distillation of the unreacted monomers. The product, which was obtained in a 39% yield, was found to contain 48% of methallyl chloride.

*Example 4*

A solution was prepared by mixing at low temperature in a lead-lined pressure vessel, 20 parts by weight of methallyl chloride, 80 parts of liquid vinyl chloride and 2 parts of benzoyl peroxide. The reaction was closed and the solution was heated at 45° C. under agitation for 87 hours. The excess vinyl chloride was then allowed to escape and methallyl chloride was removed by steam distillation. There remained in a 51% yield, a soft resin which contained by analysis 29% of methallyl chloride and 71% of vinyl chloride.

Example 5

A mixture consisting of 9.7 parts by weight of allyl chloride, 90.3 parts of liquid vinyl chloride, 0.72 part of benzoyl peroxide and 44 parts of acetone was prepared in a lead-lined pressure vessel. The vessel was closed and the charge was heated under agitation at 39° C. for 234 hours. The resulting gel was dissolved in additional amounts of acetone from which the resin was precipitated by addition of isopropanol. It was thus obtained as a strong, clear, white resin in a yield of about 54%.

This resin was readily molded at temperatures of 90–100° C. into colorless transparent moldings characterized by good stability to light. Dissolved in ketone solvents, it also proved useful in lacquers particularly where unusual chemical inertness was required, and notably heat stability with presence of iron is unusually good.

Example 6

A charge consisting of 30 parts by weight of allyl acetate, 70 parts of vinyl chloride, 50 parts of acetone and 2 parts of benzoyl peroxide was agitated 185 hours at 40° C. in a lead-lined pressure vessel. The resulting gel dissolved readily in acetone from which was precipitated in an 81% yield, a strong white resin containing by analysis 25% of combined allyl acetate and 75% of combined vinyl chloride.

A similar charge consisting of 20 parts by weight of allyl acetate, 80 parts of vinyl chloride, 60 parts of acetone and 2 parts of acetyl benzoyl peroxide was agitated 64 hours at 40° C. The resin isolated as described above was obtained in a 72% yield.

These resins were readily soluble in ketone solvents, solutions in which they were especially adapted to use in lacquers. Films deposited on iron or tin-plate were baked 30 minutes at temperatures of 325° F. and above without addition of stabilizers and without apparent decomposition of the resin. It was found that further increases of safe baking temperatures could be brought about by addition of suitable stabilizers or stabilizing pigments. In most compositions containing vinyl chloride as a component, decomposition would have occurred under these conditions.

Example 7

A very similar resin to those described in Example 6 was obtained by polymerizing together 20 parts of methallyl acetate and 80 parts of vinyl chloride in the presence of 1.22 parts of benzoyl peroxide in 62 parts of acetone. The resulting resin obtained in 71% yields after 80 hours at 40° C. was soluble in ketones and was otherwise quite similar to the products of Example 6.

Example 8

A mixture of 20 parts by weight of allyl butyrate and 80 parts of vinyl chloride was polymerized in 50 parts of acetone using 2 parts of benzoyl peroxide as a catalyst. After 67 hours at 40° C. there was obtained a 71% yield of strong, clear, white resin very similar to the products of Example 6. It was even more easily soluble in ketone solvents and was characterized by excellent stability to light and heat.

A very similar resin was obtained by polymerizing together under similar conditions 20 parts by weight of allyl caproate and 80 parts of vinyl chloride. The resin, obtained in good yields, was very soluble in ketone solvents and the resulting solutions were satisfactory for use in lacquers.

This is a division of our copending application Serial No. 327,996, filed April 5, 1940, for Conjoint polymerization products.

What we claim is:

1. As a new composition of matter, a resinous product obtained by conjointly polymerizing 50 to 99 parts of vinyl chloride and 1 to 50 parts of allyl acetate.

2. The resinous product of conjointly polymerizing 50 to 99 parts of vinyl chloride and allyl 1 to 50 parts of butyrate.

3. As a new composition of matter, a resinous product obtained by conjointly polymerizing 50 to 99 parts of vinyl chloride and 1 to 50 parts of an ester of allyl alcohol and a saturated monocarboxylic acid.

EUGENE W. MOFFETT.
ROY E. SMITH.